May 6, 1958             G. RICORDI             2,833,554
APPARATUS FOR THE SAFETY AND PROTECTION OF AUTOMOBILE PASSENGERS
Filed Aug. 17, 1955             2 Sheets-Sheet 1
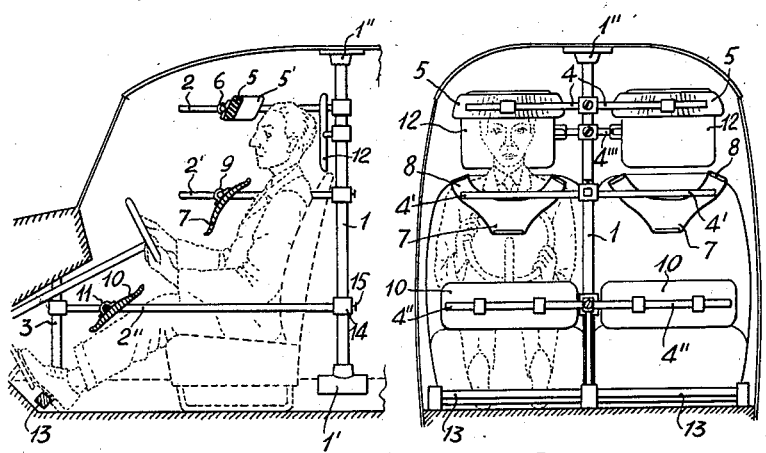
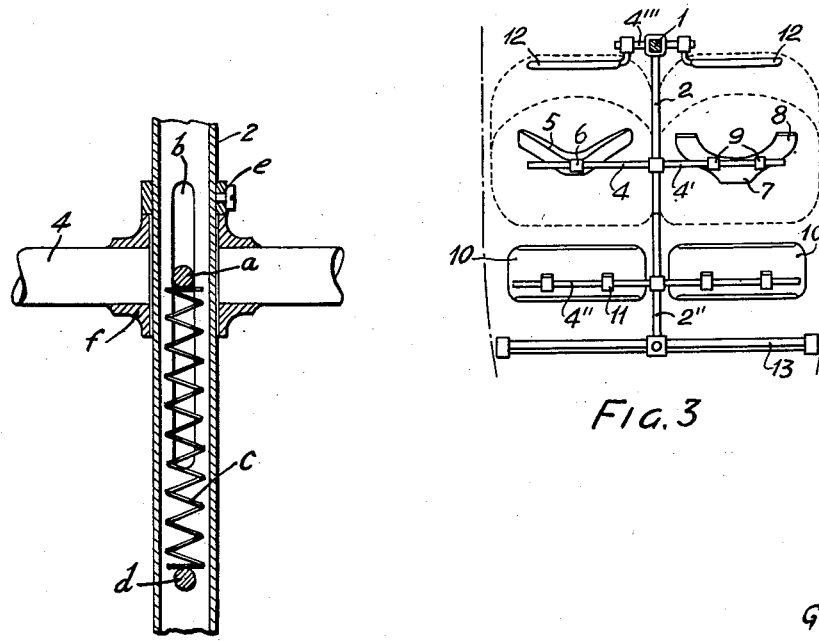
INVENTOR
GIORGIO RICORDI
BY
ATTORNEY May 6, 1958 G. RICORDI 2,833,554
APPARATUS FOR THE SAFETY AND PROTECTION OF AUTOMOBILE PASSENGERS
Filed Aug. 17, 1955 2 Sheets-Sheet 2
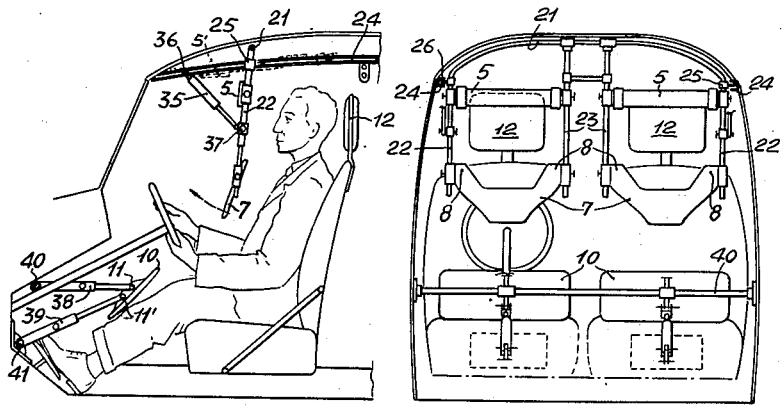
INVENTOR
GIORGIO RICORDI
BY
ATTORNEY United States Patent Office 2,833,554
Patented May 6, 1958

2,833,554

APPARATUS FOR THE SAFETY AND PROTECTION OF AUTOMOBILE PASSENGERS

Giorgio Ricordi, Milan, Italy

Application August 17, 1955, Serial No. 535,142

8 Claims. (Cl. 280—150)

It is known that the greatest percentage of deadly accidents incident to collision or shock against obstacles happen because the travelers, and especially the one seated near the driver and the driver himself are projected forward fracturing their skull against the windshield and their knees against the body, while the driver's chest is crushed against the steering wheel.

An object of the present invention is to provide a safety system for decreasing the force of the shock, by distributing the said force over a greater area and also preventing a large movement of the body when the shock takes place.

This protection system efficiently shields the body zones most commonly stricken, obliges the body to assume at the instant of the shock a position in which the portions of the body which are contacted are the strongest portions thereof, such as the forehead, the shoulders, the sternum zone, the knees, the pelvic zone and the feet. It does not constitute a constraint for the driver and passengers because it is normally spaced from the person and can be arranged and suited to the stature and position of each single person.

It further permits free liberty of movements and does not interfere with ones entering or leaving the vehicle.

According to the main feature of the invention, the apparatus comprises shaped protection plates for the head, chest and knees of the passengers and driver, the said protective plates being fixed in an adjustable incline position upon a base.

In order that the invention may be more clearly understood, reference may now be made to the accompanying drawings, in which are given some forms of embodiment, and wherein:

Fig. 1 is a side cross sectional view of a vehicle containing one form of the apparatus of the invention.

Fig. 2 is a front view of the device of Fig. 1.

Fig. 3 is a top plan view of the device of Fig. 1.

Fig. 4 is a view similar to Fig. 1 of a modified form of apparatus.

Fig. 5 is a front view of the apparatus of Fig. 4.

Fig. 6 is a detail view, partly in cross section, on an enlarged scale of connections between bars and frame taken along line VI—VI of Fig. 7.

Fig. 7 is a detail view of the connection system.

Fig. 8 is a side view of a modified form of device for protecting the head and chest.

Fig. 9 is a front view of the device of Fig. 8.

Fig. 10 is a side view of a modified form of device for protecting the knees.

Fig. 11 is a front view of the device of Fig. 10.

Fig. 12 is a detail view partly in cross section, of a damping means which may be incorporated into the system.

According to Figs. 1 to 3 the protection system comprises the column 1, constituted by a metal bar, for instance having a square section with rounded corners which is fixed in vertical position through suitable fittings 1', 1" to the floor and to the roof of closed vehicles. In the vehicles having an openable roof the said bar can be fixed only to the floor planks or by means of a supplementary cross fitting. The said column 1 is arranged in the mean longitudinal plane of the vehicle, immediately behind the front seats, supposing that the said seats are at the end of their rearward movement. To the column 1 are fastened longitudinal arms 2, 2', 2" (see Fig. 4) by means of collars 14 adjustable in height along the columns and adapted to be fixed by set screws 15. The longitudinal arm 2" extends forward and is sustained by a column 3 fixed to the floor. Upon the said arms 2, 2', 2" and column 1 are fastened the longitudinally movable cross arms 4, 4', 4", 4''', which also can be fixed by means of a screw upon the said longitudinal arms. The cross arms carry and properly position the protection devices. Upon the cross arm 4 is fixed the head protection means comprising a metal plate visor 5, so arched at its center part as to be able to receive the upper part of the forehead. The said metal plate is coated with a layer of porous rubber or with any other elastic material, and presents a greater thickness at its side portion, so as to distribute the stress over the skull proportionately to its strength. The plate 5 presents two lateral projections or wings 5' at a certain distance from the sides of the head, so as to automatically center the latter into the center part of the visor. The visor is hinged at 6 upon the transverse bar 4 so as to be adjustable as to inclination.

The protection for the chest is obtained by a metal plate 7 so shaped as to follow the anatomical shape of the chest, said metal plate also being internally covered with a layer of porous rubber so as to provide the support at the points of greater strength, the span of the shoulders and the sternal region. The said plate is provided with an upwardly running projection 8 at a certain distance from the shoulders which prevents the body from being lifted, thereby preventing the skull from being crushed against the roof of the vehicle.

The shape of the shield skirts the mamillary region, to avoid striking a person's heart. The plate 7 is also inclinably and adjustably fixed to the transverse arms 4' at 9.

Upon the transverse arms 4" are fixed the shields for the knees, comprises a plate 10 adjustably pivoted at 11. The plate is sufficiently wide to protect both knees and is also coated with a thick layer of porous rubber. It is so fixed as to be spaced about one centimeter from the knees when the foot is at the end of the travel of the pedal brake. When the knees are so shielded the pelvic region is kept in place by means of the femur.

The shield 5 for the head and shield 7 for the chest must be arranged at a certain distance from the head and chest when the driver is comfortably seated at its place.

Back of the driver's and front passenger's heads is further provided a plate 12 fixed to the cross arm 4''' and coated on both faces with porous rubber, as the said plate serves to protect the front passengers from a back shock as well as the back passengers from a front shock.

Besides, a rest or footboard 13 is provided on the floor, formed of a metal rubber coated bar for preventing the slipping of the feet.

Although presenting a sufficient elasticity and deformability the supporting system may be provided with an elastic attachment as shown in Fig. 12 having a shock absorber between the longitudinal and transverse arms. In each such attachment the bar 2 contains slots $b$, a spring $c$ and a stop $d$ for the spring $c$. The ring $f$ carries the cross arm 4 and holds the ends of rod $a$ which extends through the slots $b$. The ring $e$ provides for adjustment of the backward position of ring $f$ and cross arms 4.

The above described system represents a single example of a form of embodiment of the invention, and is especially suited for closed cars with two separate front seats. It must, of course, be modified according to the cars. Thus in the case of a single front seat a supplementary column has to be provided, arranged in the middle longitudinal plane of the car, but fixed at its foot to the floor ahead of the seat placed at the end of its frontmost position.

According to the simplified embodiment as shown in Figs. 4-7 for the protection of the driver and passenger seated by him, there is provided the metal plate visor curved at its center part so as to receive the upper part of the forehead, as described in the first embodiment, and further there is provided, for the chest's protection a metal plate 7 with projections 8, as before described and the plate 10 for protecting the knees. All of these plates are lined at their inner sides with porous rubber or other plastic and yieldable material.

The said plates are fixed as follows: parallel to the body roof a frame 21 is provided comprising a bar or tube, terminating at its ends with the two practically vertical bars 22, while at its middle are fixed the two bars 23. The frame 21 is slidable and rotatable in the guide 24 running longitudinally to the sides of the body next to the driver and eventually of the back seat passengers (not represented on the drawing).

The attachment of the frame 21 to the guide 24 (Figs. 6, 7) is effected as follows: on the tube 21 a sleeve 25 is provided. Extending from the sleeve 25 is a pivot means 26 engaging in the said channel shaped guide 24. Upon the pivot means 26 rests the block 27 containing a notch or cut-out portion 28 in which the said pivot 26 is fitted. The said block can be fixed upon the guide 24 in any position by means of a screw 29 and a wing nut 30, the said screw 29 being fittable into any of the holes 31 provided in the guide. Thus the inclination of the bars 22 can be varied by bringing them more or less near the occupant's body.

For locking the pivot 26 there is provided a lever 32 rotatable around the pin 33 and urged into a locking position by a spring 34, the said lever being pivoted upon an extension of the block 27. The pin 33 can be freed and the bar 22 displaced by manually pushing the said lever. To prevent too large an oscillation of the bars 22, though not wholly preventing their possibility to be displaced, a telescopic bar 35 is provided, which can contract or expand longitudinally against the action of an inside spring (not represented) the said bar being fixed at 36 upon the guide 24, while its position on the bar 22 can be varied by means of a screw 37 provided on the bar 22. Between the bars 22 and 23 are fixed by means of screws, that is, in variable slanting positions, both the visor 5 and the metal plate 7 for the protection of the chest, constructed similarly to the one first described and also vertically displaceable.

The knee protecting plate 10 is fixed upon two bars 38, 39 pivoted at 11, 11' over the said plate, the bar 38 being pivoted at its other end to a bar 40 passing across the body of the car and fixed at the sides of the latter. The bar 39, on the contrary, is directly fixed at 41 and pivoted to the vehicle's body. In such a way a perfect mobility of the protection plate 10 is obtained, it being possible to vary its height by means of a rotation of the two bars and its inclination by means of rotation of the plate 10 around the two pins 11, 11'.

Analogously to the first embodiment of plate 12, coated on both sides with porous rubber or other elastic material, can be provided, which plate is directly fastened to the driver's seat and serves to either protect the front passengers from a rear shock, or the rear passengers from a front shock.

In such a way, not only can the plates 5 and 7 be given various inclinations around their pivots 6 and 9, but the bars carrying the said shields can be brought to an out of use position, as shown at 5' in Fig. 4 with broken lines, and besides, by moving the block 27 the distance of the bars from the driver and passengers can be varied, so that the protection plates can be adjusted for any height and distance from the person.

In the form of embodiment represented by the Figs. 8 to 11 the guide 24' is T-shaped and has its upper transversal arm shorter, and the vertical one 24" more elongated to permit pivoting of the arm 35'. The terminal portion of the said arm is bent in order to permit its alignment with the roof when out of use, by rotating it in the direction of the arrow F (Fig. 8).

The bars 22 and 23 of the form of execution of the Figs. 4 to 7 are here assembled to form a frame carrying the protection plates 5 and 7 and represented by a broken line 22', 22" and 23, repeating itself in front of the two seats, so that the two elements of the pair can be made independent of the center pivot 21' and differently adjustable to their positions. Besides, in this manner the frame 21 parallel to the roof of the vehicle is eliminated. In an analogous way the support of the knee-piece 10 can be simplified as shown in Figs. 10 and 11 by means of a bar 40' having its ends 40" bent at a right angle and slid into supporting tubes 42 fixed to the car floor, the adjustment of the sliding action and the inclination of the plates 10 being stabilized with set screws as in the preceding examples.

The features and principles underlying the invention described above in connection with specific exemplifications will suggest to those skilled in the art many other modifications thereof. It is accordingly desired that the appended claims shall not be limited to any specific feature or details thereof.

I claim:

1. A protection and safety system for seated passengers in an automobile, comprising in combination a head shielding plate, a chest shielding plate, at least one shielding plate for the knees and supporting means spaced from the regions directly in front of and directly in back of the seated passenger, said supporting means comprising arm-like projections for holding said head shielding plate and said chest shielding plate in slanting positions at an adjustable distance in front of the head and chest, respectively, of the seated passenger, said supporting means also comprising elements for affixing the same to the automobile body.

2. A protection and safety system as claimed in claim 1 comprising, in addition, means for connecting the knee shielding plate to the said supporting means.

3. A protection and safety system as claimed in claim 1 in which said head shielding plate comprises a center portion approximating the shape of the front portion of the head and laterally extended wings, and a layer of yieldable material on the inner side of said heat shielding plate.

4. A protective and safety system as claimed in claim 1 wherein said chest shielding plate comprises upwardly extending portions on each side thereof adapted to extend over the shoulders of a passenger when the main portion thereof fits against the chest of said passenger.

5. A protective and safety system as claimed in claim 1 wherein said knee shielding plate is mounted in slanting position and is curved to follow the shape of the legs at the knees.

6. A protective and safety system as claimed in claim 1 wherein said supporting means comprises a longitudinal shaft adapted to extend vertically between the floor and top of the automobile in the region back of the center portion of the front seat of said automobile.

7. A protective and safety system as claimed in claim 1 wherein said supporting means comprises guide members adapted to be fitted at the sides of the top of said automobile, frame members extending from one side of the automobile to the other adjacent the top of the latter and containing adjustable studs at the ends thereof adapted to be adjustably fixed to the guide members, vertical bars extending from said frame members to adjustably carry said head and chest shielding plates.

8. A protective and safety system as claimed in claim 7, comprising a damper means connected to at least one of said supporting means, said damper means comprising telescoping tubes containing internal means adapted to resist movement of the tubes with respect to each other.

References Cited in the file of this patent

UNITED STATES PATENTS

| | | |
|---|---|---|
| 2,025,822 | Pryor | Dec. 31, 1935 |
| 2,267,373 | Carlisle | Dec. 23, 1941 |
| 2,475,588 | Bierman | July 12, 1949 |
| 2,499,993 | Gregg | Mar. 7, 1950 |
| 2,633,906 | Franz | Apr. 7, 1953 |
| 2,740,642 | Atwood | Apr. 3, 1956 |

FOREIGN PATENTS

| | | |
|---|---|---|
| 1,068,761 | France | Feb. 10, 1954 |
| 848,310 | Germany | Jan. 19, 1953 |